United States Patent
Karguth

(10) Patent No.: US 6,223,277 B1
(45) Date of Patent: Apr. 24, 2001

(54) DATA PROCESSING CIRCUIT WITH PACKED DATA STRUCTURE CAPABILITY

(75) Inventor: Brian J. Karguth, Sherman, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 08/995,586

(22) Filed: Dec. 22, 1997

Related U.S. Application Data

(60) Provisional application No. 60/067,088, filed on Nov. 21, 1997.

(51) Int. Cl.[7] .................................................. G06F 15/00
(52) U.S. Cl. ............................ 712/224; 712/5; 712/23; 712/29; 712/34; 712/200; 712/212; 712/232
(58) Field of Search ................................ 712/1, 3, 5, 23, 712/24, 200, 232, 9, 34, 212, 224

(56) References Cited

U.S. PATENT DOCUMENTS

| | | | |
|---|---|---|---|
| 5,764,946 | * 6/1998 | Tran et al. ........................ | 395/464 |
| 5,781,457 | * 7/1998 | Cohen et al. ..................... | 708/231 |
| 5,822,559 | * 10/1998 | Narayan et al. .................. | 395/390 |
| 5,896,305 | * 4/1999 | Bosshart et al. .................. | 708/209 |

* cited by examiner

Primary Examiner—Daniel H. Pan
Assistant Examiner—Dzung C. Nguyen
(74) Attorney, Agent, or Firm—J. Dennis Moore; Wade James Brady, III; Frederick J. Telecky, Jr.

(57) ABSTRACT

A packed data structure processor (25) is disclosed. The packed data structure processor (25) includes a register file (24) of multiple registers (REG0 through REG31), each of which is connected to an input of each of a plurality of operand multiplexers (26). Each operand multiplexer (26) is associated with a shift/mask circuit (28), which permits the selection of a particular portion (e.g., BYIE, WORD, DWORD) of the contents of a selected register file, for use as an operand. An arithmetic logic unit (ALU) (30) performs data processing operations upon the operands, and presents results on writeback bus (WBBUS), to external memory (18) over a memory interface (37), or to a register file (42) associated with other circuitry (44) over a coprocessor interface (41). A destination selector (40) is capable of writing to only a selected portion of a selected register, thus permitting a packed data structure to be present within the register file (24). The packed data structure processor (25) is capable of performing single cycle test and branch operations, as a program counter (36) is closely coupled to the ALU (30).

22 Claims, 2 Drawing Sheets

DATA PROCESSING CIRCUIT WITH PACKED DATA STRUCTURE CAPABILITY

CROSS-REFERENCE TO RELATED APPLICATIONS

This application claims the benefit, under 35 U.S.C. §119(e)(1), of U.S. Provisional Application No. 60/067,088 (TI-25925PS), filed Nov. 21, 1997, and incorporated herein by this reference.

BACKGROUND OF THE INVENTION

This invention is in the field of integrated circuits, and is more specifically directed to programmable integrated logic circuits for executing data processing operations.

As is well known in the art, many advances have been made in recent years in increasing the performance of programmable logic integrated circuits, the prime example of which is the microprocessor. The architecture of modern general purpose microprocessors, such as those having the functionality and performance on a par with PENTIUM microprocessors available from Intel Corporation, generally includes one or more relatively long "pipelines", in which multiple instructions are in various stages of execution in any given machine cycle. For example, a six-stage pipeline may have six instructions in process in a given cycle, with different instructions in the prefetch, fetch, decode, schedule, execute, and writeback stages within a single cycle. Indeed, many microprocessors now are of the so-called "superscalar" type, in which multiple pipelines are provided. The pipeline technique is of particular benefit in microprocessors of the so-called complex instruction set computer (CISC) type, where most of the instructions in the available instruction set require multiple cycles to execute; through the use of pipelining, one instruction may be retired in each cycle, giving an apparent performance of one cycle per instruction.

A difficulty with pipelined architectures arises in the case of conditional branching instructions. As is fundamental in the art, conditional branch instructions change the program flow in response to various conditions, including the relationship of variables to one another or to a constant value, and including the state of various flag or status bits. In a pipelined microprocessor, however, the result of the condition will not be known until after the next several instructions have proceeded along the pipeline to some extent. However, if the condition upon execution transfers control to instructions other than those which have already partially progressed along the pipeline, the pipeline must be flushed and execution restarted from the prefetch stage for the instruction corresponding to the correct target of the conditional branch. This flushing of the pipeline, of course, results in a significant performance penalty. Accordingly, significant circuit overhead is now spent in modem microprocessors to implement branch prediction techniques, as the overall performance of the microprocessor depends in large part upon the accuracy with which conditional branches are predicted, and thus the extent to which pipeline flushes resulting from mispredicted branches are avoided.

By way of further background, microprocessors of the reduced instruction set computer (RISC) type are known in the art; examples of such RISC devices are the 88 k line of microprocessors available from Motorola, and the i860 line of microprocessors available from Intel Corporation. While the reduced instruction set nature of RISC processors tends to reduce the frequency with which multiple cycle instructions are encountered, conventional RISC processors are also pipelined, and thus incorporate the use of branch prediction techniques to avoid pipeline flushes.

Another difficulty encountered by modem microprocessors, of both the CISC and RISC type, occurs from operations upon multi-field data structures, in which the operands are of varying bit width (e.g., eight, sixteen, and thirty-two bit fields). Such multi-field data structures are often encountered in applications and microprocessors in which much of the data storage is off-chip, but where on-chip memory (although limited in size) provides important performance benefits; in such cases, multiple smaller operands may be stored within a single register or addressable memory location, while larger operands may occupy the entire register or memory location. Conventional microprocessors require multiple machine cycles to operate upon multi-field data structures, because of the need to fetch the operand, mask off the un-associated portions of the register or memory location, shift the desired operand to the proper bit position for execution of the instruction, and shift the result to the desired bit position for a masked write into the register or on-chip memory location. While pipelined microprocessors are able to efficiently handle such multi-field data operations when overall performance is measured (approaching one instruction retired per machine cycle), these microprocessors are subject to performance penalty for mispredicted branches and thus are likely to include significant circuit and performance overhead necessary to reasonably predict branch behavior.

Certain system applications of logic circuitry are sufficiently cost-sensitive as to prohibit the use of a general-purpose microprocessor, particularly one in which the maximum performance architectural features of superscalar pipelined operation, with complex branch prediction, are utilized. As such, a need exists in the art for programmable logic circuitry which may be implemented in a low-cost manner, both relative to the cost of the processing logic as well as the cost of associated memory.

However, performance is still of concern in these system applications, especially in the case where the logic circuitry is being required to operate on so-called real-time data. An example of real-time processing is the processing of message packet cells in telecommunications, such as according to the Asynchronous Transfer Mode (ATM) protocol. Especially when video signals are being transmitted in combination with voice signals, real-time processing of the messages presents significant performance demands on the processing logic circuitry. As such, low-cost logic circuitry used in telecommunications processing also must provide a high degree of performance.

It is therefore desirable in many systems, such as those processing ATM communications, to utilize programmable logic circuitry which, for reasons of performance, relies upon on-chip memory for storage of operands and, for reasons of cost, is implemented with a minimum chip area. As a result, packed data structures are attractive in these type of systems, as the packing of data of various field widths into on-chip memory provides maximum utilization of on-chip memory, thus obtaining performance at minimum cost. However, as noted above, multi-field data structures typically involve, in conventional logic circuitry, multiple cycles to perform the shifting, masking, and other operations necessary for handling these data structures. These additional cycles either result in lower performance for the processing circuitry, or in implementation of pipelines and branch prediction techniques.

In addition to the presence of multi-field data structures, however, certain of these applications necessitate a high frequency of conditional branch operations, especially in performing real-time telecommunications processing. As such, the use of pipeline architectures and branch prediction techniques, in addition to increasing implementation cost, also degrades performance due to mispredicted branches, given the large number of branch instructions in such code.

BRIEF SUMMARY OF THE INVENTION

It is therefore an object of the present invention to provide programmable logic circuitry that operates at a reasonable performance level, without greatly expanding on-chip memory resources and overhead.

It is a further object of the present invention to provide such programmable logic circuitry which readily operates upon packed data structures.

It is a further object of the present invention to provide such programmable logic circuitry in which the program code density can be optimized.

It is a further object of the present invention to provide such programmable logic circuitry in which operations may be performed upon packed data structures in single machine cycles.

It is a further object of the present invention to provide such programmable logic circuitry in which conditional branch operations may be carried out in a single machine cycle.

It is a further object of the present invention to provide such programmable logic circuitry in which instruction fetches can be performed concurrently with data transfers.

It is a further object of the present invention to provide such programmable logic circuitry having interface capability sufficient to facilitate embedding of the circuitry within an application specific integrated circuit (ASIC).

Other objects and advantages of the present invention will be apparent to those of ordinary skill in the art having reference to the following specification together with its drawings.

The present invention may be implemented in a microprocessor architecture having a plurality of general purpose registers, each of which may store data operands of varying bit width. Each register is coupled to one of a plurality of multiplexers, the output of each of which is coupled to a shift/mask unit. The shift/mask units are in turn connected to arithmetic logic circuitry. This architecture permits a single instruction to operate upon any portion of any one of the general purpose registers in a single machine cycle.

According to another aspect of the present invention, the architecture of the programmable logic circuitry implements a single cycle test and branch operation. According to still another aspect of the present invention, the programmable logic circuitry includes a coprocessor interface which is written to or read from by way of special instructions, where the special instructions include autoconcatenation of immediate operands into the write operations; a register file, connected to the coprocessor interface, is directly accessible by way of the special instructions.

DETAILED DESCRIPTION OF THE INVENTION

As will become apparent from the following description, the preferred embodiment of the present invention is particularly beneficial when used in the processing of real-time data and signals, such as in the field of telecommunications. However, those of ordinary skill in the art having reference to this specification will readily recognize that the present invention may be utilized to advantage in many types of applications, especially those in which both circuit cost and also processing performance are of concern. In particular, it is contemplated that the present invention may be used in many places in which sequential logic, or state machines, are now utilized, as the present invention can provide similar performance at a competitive cost with such logic, but also provides the flexibility attendant with programmable devices such as microprocessors. As such, the description of the system implementation hereinbelow is provided by way of example only, and is not intended to limit the scope of the present invention.

Figure 1:
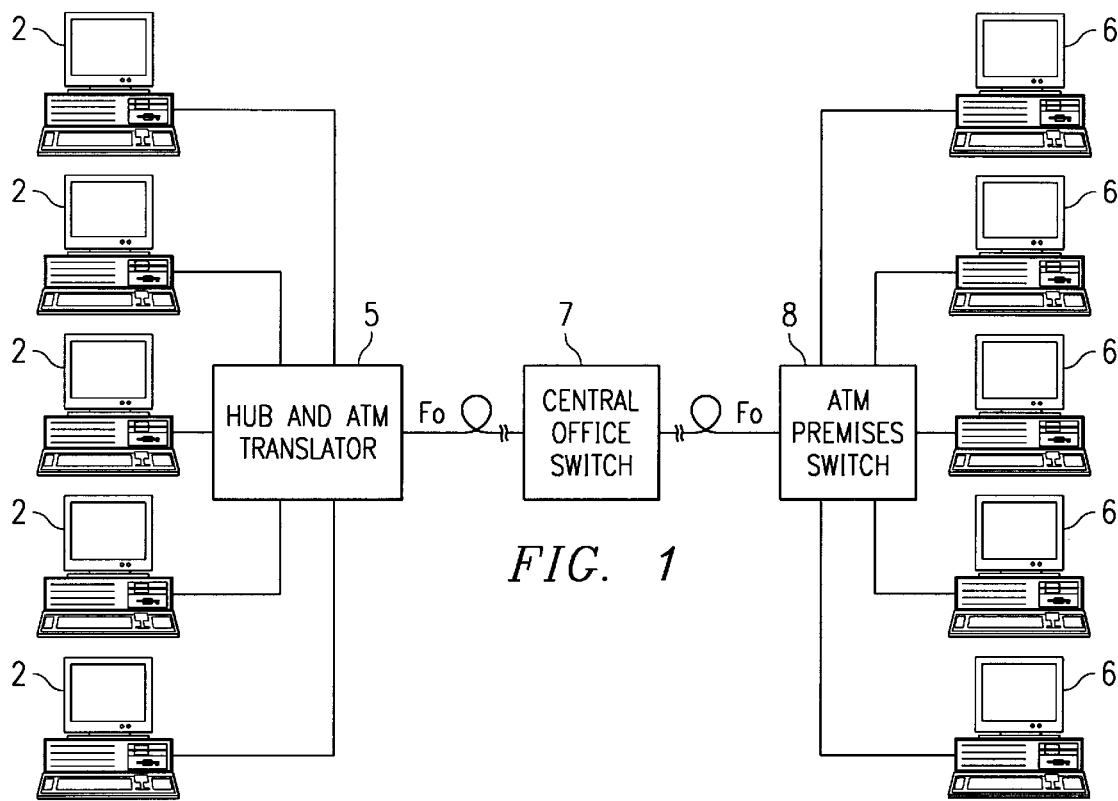
FIG. 1 is an electrical diagram, in block form, of a communications system incorporating the preferred embodiment of the present invention.

Referring now to FIG. 1, an example of a communications system within which the present invention may be implemented will now be illustrated by way of example. The example of FIG. 1, as will become apparent from the following description, relates to the way in which data processing devices, such as computers in a Local Area Network (LAN), communicate with other data processing devices by way of Asynchronous Transfer Mode (ATM) communications; these other data processing devices may themselves be computers in a different LAN, or stand-alone computers, or other systems with which the desired communications are to be carried out. It will be understood by those in the art, having reference to this description, that the present invention may be implemented in communications systems of different architecture from that shown in FIG. 1, the system of FIG. 1 being provided herein simply by way of example. It is contemplated that such other implementations are also within the scope of the present invention.

As illustrated in FIG. 1, the exemplary communications system effects communication between one of computers 2, arranged in a LAN, to one of computers 6 at a remote location. Computers 2 in this example are arranged in a LAN of the Ethernet type, such that each computer 2 is in communication with network hub and ATM translator 5; of course, computers 2 may alternatively be arranged in a token-ring LAN or other LAN type. In an Ethernet LAN, as many as 2048 separate communications channels may be established, under the control of network hub and ATM translator 5. Network hub and ATM translator 5, the construction and operation of which will be described in further detail hereinbelow, is connected to fiber optic facility FO, so that communications to and from one of computers 2, from another computer outside of the LAN, may be carried out. Fiber optic facility FO, is received by one or more of a network of central office switches 7, which makes the connection between network hub and ATM translator 5 and the destination specified in the communication.

In this example, computers 6 are located at a remote location. In this example, remote computers 6 are each connected to ATM premises switch 8. ATM premises switch 8 enables ATM communication among computers 6 in workgroups or departments. In this example, ATM premises switch 8 is also connected to an external fiber optic facility FO, such that computers 6 in its local ATM workgroup may also communicate ATM messages to destinations outside of the workgroup. No translation is carried out by ATM premises switch 8, as it handles only ATM communications (whether over fiber optic facility FO or within the workgroup of computers 6). Alternatively, if computers 6 are also arranged in a LAN, another instance of network hub and ATM translator 5 would be implemented in place of ATM premises switch 8, the arrangement of computers 6 in FIG. 1 being presented by way of example only.

As noted above, network hub and ATM translator 5 interfaces both to computers 2 over the Ethernet LAN, and also to fiber optic facility FO for ATM communications. As such, network hub and ATM translator 5, in addition to its hub management functions, must also translate the Ethernet packets, which are about 1,500 bytes in length, into fixed-length ATM cells for communications from computers 2 over fiber optic facility FO, and vice versa for received communications.

Figure 2:
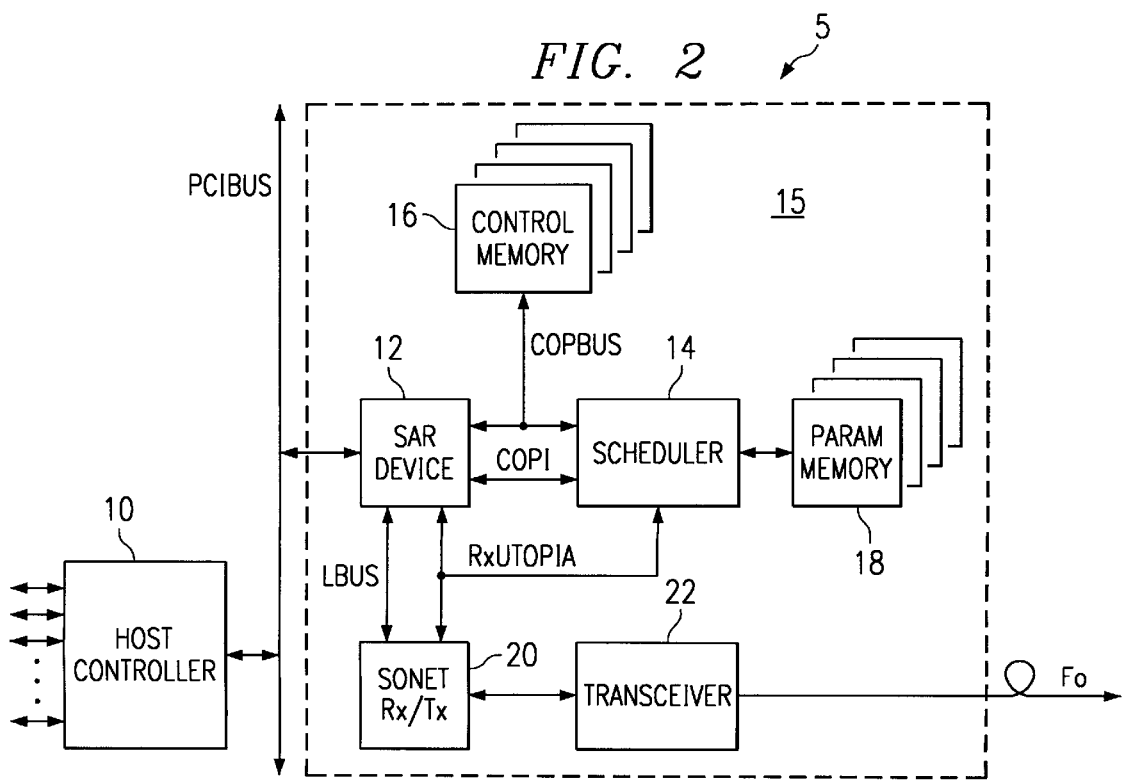
FIG. 2 is an electrical diagram, in block form, of a network hub and Asynchronous Transfer Mode (ATM) translator in the system of FIG. 1, according to the preferred embodiment of the invention

Referring now to FIG. 2, the construction of network hub and ATM translator 5 according to the preferred embodiment of the invention will now be described. According to this embodiment of the invention, network hub and ATM translator 5 includes host controller 10, which is a conventional computer workstation for handling the Ethernet hub functions for Ethernet communications from computers 2; as such, it is contemplated that host controller 10 will have sufficient performance capability to operate in this server capacity. In this example, host controller 10 includes, along with its data processing functionality, high-performance local bus PCIBUS which operates according to the well-known PCI bus standard. In combination with host controller 10, network hub and ATM translator 5 includes translator card 15 which interfaces with local bus PCIBUS and which includes circuitry for performing LAN to ATM translation and for interfacing to fiber optic facility FO as shown. As such, host controller 10 includes the necessary functionality for recognizing those communications from one of computers 2 that are intended for a remote destination, and for forwarding these communications to translator card 15 over local bus PCIBUS.

Translator card 15 includes SAR device 12, which performs segmentation and reassembly functions for the communications handled by translator card 15, and as such is connected to local bus PCIBUS of host controller 10. An example of a suitable SAR device 12 for use in connection with the preferred embodiment of the invention is the TNETA 1575 ATM Segmentation and Reassembly Device available from Texas Instruments Incorporated (the assignee of the present invention). SAR device 12 is connected, via local bus LBUS, to SONET receive/transmit circuitry 20 which encodes and decodes the communications according to the well-known SONET standard. SONET receive/transmit circuitry 20 is in turn connected to transceiver 22, which drives signals onto fiber optic facility FO and receives signals therefrom, in the conventional manner.

Translator card 15 in network hub and ATM translator 5 according to the preferred embodiment of the invention includes scheduler 14, which is connected to SAR device 12 and to control memory 16 by way of coprocessor bus COPBUS. According to the preferred embodiment of the present invention, scheduler 14 is implemented into a single integrated circuit device. Control memory 16 contains a configuration space that can be accessed by system software, and which provides configuration, initialization, and error handling functionality. Scheduler 14 is also connected to SAR device 12 via control bus COPI, by way of which a clock is provided to scheduler 14 for synchronization; control bus COPI also carries control signals for indicating to scheduler 14 that an ATM cell has been received or sent, a control signal serving as a reset signal to scheduler 14, and signals from scheduler 14 to SAR device 12 concerning the status of FIFO resources and for providing an interrupt thereto. Scheduler 14 also receives signals over bus RXUTOPIA, which corresponds to lines in a conventional Universal Test and Operations Physical Interface for ATM (UTOPIA) bus protocol; scheduler 14 operates only as an observer over lines RXUTOPIA, so that it is aware of the receipt of incoming ATM cells.

Scheduler 14 is also connected to parameter memory 18. Parameter memory 18 is a memory resource, off-chip from scheduler 14, for storing information regarding each of the Ethernet channels handled by network hub and ATM translator 5. This parameter memory stores indicators, for each of the channels, regarding the various cell rates at which communications for that channel are to be carried out, as well as channel identifiers such as the Virtual Path Identifier (VPI) or Virtual Channel Identifier (VCI) for that channel; additionally, parameter memory 18 also stores, for some of the channels, timestamp offset and base values associated with each Ethernet channel, with the value of the timestamp indicating the time at which the next cell for that channel is to be processed for communication over fiber optic facility FO. In this embodiment of the invention, parameter memory 18 may include on the order of 64 k thirty-two bit words.

Figures 3, 4:
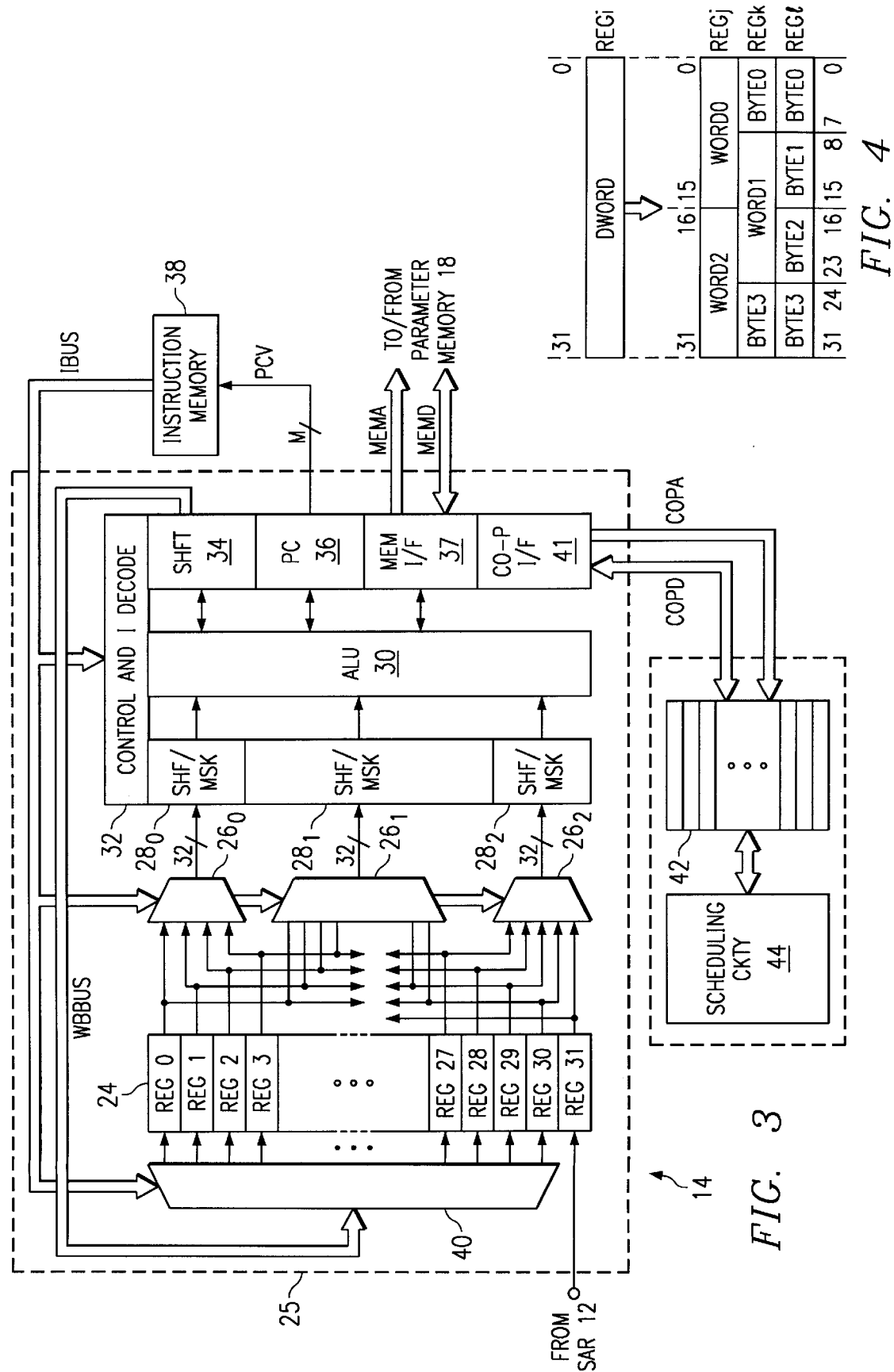
FIG. 3 is an electrical diagram, in block form, of the construction of a packed data structure processor according to the preferred embodiment of the invention.
FIG. 4 is a memory map illustrating the organization of exemplary members of the register file in the packed data structure processor according to the preferred embodiment of the invention.

Referring now to FIG. 3, the construction of scheduler 14 according to the preferred embodiment of the present invention, will now be described in detail. According to the preferred embodiment of the invention, scheduler 14 is arranged to include packed data structure processor 25 which is particularly suited for the efficient processing of packed data structures, especially through the use of single-cycle instructions, as will be described hereinbelow. As will become apparent from the following description, packed data structure processor 25 is a non-pipelined Harvard architecture processor, which has been found, in connection with the present invention, to be particularly suitable for performing control functions of real-time signals, such as in scheduler 14 of network hub and ATM translator 5.

Packed data structure processor 25 interfaces with instruction memory 38, which may be either or both random access memory (RAM) or read-only memory (ROM) for storing instruction codes according to which packed data structure processor 25 operates. In this regard, packed data structure 25 issues a program counter value on lines PCV to instruction memory 38, which in turn presents an instruction code on bus IBUS back to packed data structure 25, in a manner which will be described in further detail hereinbelow.

Packed data structure processor 25 also includes interfaces with buses to other circuitry in scheduler 14, examples of which are illustrated in FIG. 3; other interface circuitry and buses may also directly or indirectly interface with packed data structure processor 25, particularly in carrying out the functionality of scheduler 14 as illustrated in block form in FIG. 2. One example of such interfacing is illustrated in FIG. 3 by way of memory address bus MEMA and memory data bus MEMD which are connected between packed data structure processor 25 and parameter memory 18. Also as illustrated in FIG. 3, according to the preferred embodiment of the invention, packed data structure processor 25 connects to other circuitry in scheduler 14, for example scheduling circuitry 44 by way of register file 42, via coprocessor address bus COPA and coprocessor data bus COPD. While buses MEMA, MEMD, COPA, COPD are illustrated in FIG. 3 as separate buses, certain ones of the lines in these buses may be shared among one another (e.g., some or all of data lines MEMD may also serve as data lines COPD), with the distinction therebetween carried out by way of separate instructions, if desired.

As shown in FIG. 3, packed data structure processor includes general purpose register file 24, which in this example includes thirty-two thirty-two-bit registers (REG0 through REG31). In this example, register REG31 is dedicated to storing status information received from circuitry external to packed data structure processor 25 (but, in this example, still within scheduler 14), and as such functions as a read-only register within packed data structure processor 25. Each of the remaining registers REG0 through REG30 are general purpose registers which may be written to with data presented on writeback bus WBBUS under the control of destination selector 40; the selected one of registers REG0 through REG30 to be written is specified by the instruction code on instruction bus IBUS. According to the preferred embodiment of the invention, destination selector 40 is operable, in response to a portion of the instruction code on instruction bus IBUS, to control four independent write enable lines, so that control of writes to register file 24 on as low as the byte-level may be effected.

In this embodiment of the invention, up to three operands may be handled during the execution of an instruction by packed data structure processor 25; as such, three operand multiplexers $26_0$, $26_1$, $2_2$ are provided to receive operands from register file 24. Each of registers REG0 through REG31 (i.e., including the status information in register REG31) in packed data structure processor 25 are in communication with each of operand multiplexers 26. Under the control of the instruction code on instruction bus IBUS, each of operand multiplexers 26 communicates the contents of the selected one of registers REG0 through REG31 to an associated shift/mask unit 28. According to the preferred embodiment of the invention, each of operand multiplexers $26_0$, $26_1$, $26_2$ is associated with a corresponding one of shift/mask units $28_0$, $28_1$, $28_2$ respectively. Each of shift/mask units 28 present an output to arithmetic logic unit (ALU) 30.

ALU 30 includes the appropriate circuitry for executing arithmetic and logical operations upon the operands presented thereto by shift/mask units 28, under the control of instructions retrieved from instruction memory 38 on instruction bus IBUS, and decoded by control and instruction decode circuitry 32. According to this preferred embodiment of the invention, ALU 30 is an unsigned integer processor, as such construction is suitable for the ATM scheduling function of scheduler 14; it will, of course, be apparent to those in the art that other types of arithmetic and logical circuitry for effecting other classes of operations (e.g., signed integer, floating-point) may alternatively be used. Each of shift/mask units 28 are also controlled by control and instruction decode circuitry 32, to select either a portion or all of the register contents forwarded thereto by its associated operand multiplexer 26, and present this selected portion to ALU 30. In this example, the data presented by each shift/mask unit 28 to ALU 30, and upon which ALU 30 operates in executing the instruction, may be eight bits, sixteen bits, or thirty-two bits, as will be described in further detail hereinbelow.

ALU 30 communicates the results of its operation to one or more output functions of packed data structure processor 25 In this example, data results that are to be written back into register file 24 are applied to shifter 34, to place the operand in the appropriate bit positions of the destination one of registers REG0 through REG30; shifter 34 then presents these writeback results on writeback bus WBBUS to destination selector 40. In addition, ALU 30 updates program counter 36, either by incrementally advancing the contents thereof or by applying an offset thereto (e.g., as the result of a branch instruction as will be described in further detail hereinbelow). ALU 30 also is coupled to memory interface 37, for writing results of the operation to parameter memory 18 over buses MEMD, MEMA as discussed above, and for also reading data from parameter memory 18 for loading one of registers REG0 through REG30 in register file 24 (via shifter 34 and writeback bus WBBUS). Similarly, ALU 30 is coupled to other circuitry such as register file 42, over coprocessor buses COPD, COPA, by way of which the results of operations by ALU 30 may be written to register file 42 or operands read therefrom for loading into register file 24 via shifter 34 and writeback bus WBBUS, as in the case of memory accesses.

Packed data structure processor 25 is thus arranged as a true Harvard architecture processor, as its instruction buses (lines PCV, instruction bus IBUS) are orthogonal to its data buses (writeback bus WBBUS, and external buses MEMD, COPA). Because of this orthogonal architecture, instructions may be fetched and executed concurrently with data transfers. For example, an arithmetic operation with the results written to register file 24 may be executed in a single machine cycle, considering that the program counter value is applied by program counter 36 to instruction memory 38, in response to which instruction bus IBUS applies the instruction to operand multiplexers 26 to select the operands to be used by ALU 30 (via shift/mask units 28) for execution, following which the results are applied via shifter 34 and writeback bus WBBUS to destination selector 40, which writes the results to the destination register in register file 24 under the control of the instruction being executed as indicated on instruction bus IBUS. Those of ordinary skill in the art will readily recognize that other instructions, including load/store operations and the like, can be similarly executed in a single cycle by the architecture of packed data structure processor 25 according to this preferred embodiment of the present invention.

In operation, as noted above, packed data structure processor 25 is particularly well suited for operating upon multi-field data operands as are encountered in packed data structures. This operation will now be described in detail. FIG. 4 illustrates the possible arrangements of operands within various ones of registers REG0 through REG30 in register file 24. In this example, register REGi contains a double-word (i.e., thirty-two bit) operand, which occupies location DWORD which extends from bit position 0 to bit position 31 in register REGi. Register REGj contains two operands, each of word (sixteen-bit) size; one operand occupies location WORD0 from bit position 0 to bit position 15, while the other operand occupies location WORD2 from bit position 16 to bit position 31 of register REGj. Register REGk contains three operands, two of byte (eight-bit) size and one of word size; in this example, the byte operands occupy locations BYTE0 (bits 0 to 7) and BYTE3(bits 24 to 31), and the word operand occupies location WORD1 (bits 8 to 23). Of course, these three operands may be arranged in other ways, such as with the word operand in either of locations WORD0, WORD2 and the byte operands filling the remaining byte locations. Register REG1 in FIG. 4 illustrates the arrangement of four byte width operands, in byte positions BYTE0 through BYTE4. In this packed data structure arrangement, each register REG0 through REG30 in register file 24 may be organized differently, depending upon the nature of the operands and the program being executed; in addition, there may or may not be a relationship among the operands stored in adjoining locations of the same register.

According to the preferred embodiment of the invention, the instruction formats as stored in instruction memory 38 permit selection of the desired operand stored in register file 24 and processing thereof in a particularly efficient manner. The following table illustrates the instruction format for an arithmetic and logical function executable by packed data structure processor 25 according to the preferred embodiment of the invention:

| OPCODE (31:25) | IO (24) | Operand2 (23:16) | SRCsel (15:13) | SRC (12:8) | DSTsel (7:5) | DST (4:0) |
|---|---|---|---|---|---|---|

In this example, the OPCODE field in bit positions 31:25 of the instruction specifies the particular arithmetic or logical operation to be carried out (e.g., ADD, XOR, SET, AND, etc.). Bit positions 4:0 and 12:8 provide a five-bit selection code by way of which the destination and source registers, respectively, for the instruction are addressed in register file 24 (register file 24 containing thity-two registers REG0 through REG31). As noted above, register REG31 cannot serve as a destination.

Bit positions 7:5 and 15:13 each provide a three-bit code, by way of which the desired portion of the destination and source registers are to be selected by shift/mask units 28. In this example, the three bit code, in each case, make this selection of locations within the register as follows (referring also to FIG. 4):

| Bits | Meaning |
|---|---|
| 000 | Select BYTE0 (bits 7:0) of addressed register |
| 001 | Select BYTE1 (bits 15:8) of addressed register |
| 010 | Select BYTE2 (bits 23:16) of addressed register |
| 011 | Select BYTE3 (bits 31:23) of addressed register |
| 100 | Select WORD0 (bits 15:0) of addressed register |
| 101 | Select WORD1 (bits 23:8) of addressed register |
| 110 | Select WORD2 (bits 31:16) of addressed register |
| 111 | Select DWORD (bits 31:0) of addressed register |

As noted above, the same coding applies to bits 15:13 for the source register as to bits 5:3 for the destination register. As apparent from this coding, any one of the byte, word, or double-word operand lengths are readily selectable for use as the operand in the instruction, with the results writable into any one of the operand lengths in the destination register.

According to the preferred embodiment of the present invention, the second operand in the arithmetic or logical instruction may be an immediate operand, or the contents of one of the registers in register file 24. In this regard, bit position 24 (IO) in this instruction indicates, when set, that bit positions 23:16 contain an immediate operand value for use in the arithmetic or logical operation specified by the OPCODE portion of the instruction. If bit position (IO) is not set, bit positions 23:16 contain a second source register in register file 24, with bit positions 20:16 selecting one of the thirty-two registers in register file 24 as the source register, and bit positions 23:21 containing a three-bit code indicating the location (BYTEX, WORDx, or DWORD) within that source register, coded as described above. In this case of the second source register, the appropriate ones of operand multiplexers 26 and shift/mask units 28 again select the addressed portion of the addressed register in register file 24, for application to ALU 30 along with the first source operand determined by bit positions 15:8 as described above.

As a result of this construction, one or more operands selected by one of operand multiplexers 26 according to the instruction are individually shifted and masked by the associated shift/mask unit 28, in the same machine cycle, prior to presentation to ALU 30 for execution of the instruction. This single-cycle operation is in stark contrast to conventional microprocessor architectures, which necessitate separate shift and mask operations on each operand, necessarily consuming additional machine cycles. Similarly, the write-back operation according to the preferred embodiment of the present invention also shifts the output result from ALU 30 into the proper position within the result word, with the remaining bits (if any) "zero-packed", and presented on write-back bus WBBUS to the destination register selected by destination selector 40 under the control of the instruction bits 7:0 described hereinabove; as noted above, separate write enable control is effected by destination selector 40, so that one or more of the byte locations may be written with the contents of writeback bus WBBUS (the remaining bits being masked from the write). This construction and operation is especially beneficial in packed data structures, where contents of external memory are tightly packed within on-chip memory for high performance operation, as in packed data structure processor 25 according to the preferred embodiment of the present invention.

Packed data structure processor 25 according to the preferred embodiment of the present invention, based upon its construction, is also operable to execute single cycle test and branch instructions. It has been observed, in connection with the present invention, that programs for executing communications control operations such as performed by scheduler 14 according to the preferred embodiment of the invention include a high frequency of branching operations. In addition, given the real-time nature of the control function as well as the desire to maintain a low cost realization of this function, a high degree of code density is also desirable. These desirable features are obtained through the implementation of a single cycle test and branch operation, as will now be described.

As noted above, packed data structure processor 25 is a non-pipelined architecture, with ALU 30 being directly coupled to program counter 36 as shown in FIG. 3. Due to this architecture, an example of a preferred single-cycle test and branch instruction according to the preferred embodiment of the invention is as follows:

| OPCODE (31:27) | Offset (26:25) | IO (24) | Operand2 (23:16) | SRCsel (15:13) | SRC (12:8) | Offset (7:0) |
|---|---|---|---|---|---|---|

In this example, the OPCODE field indicates that the instruction is a quick test and branch instruction, and also indicates the type of test to be performed. According to this preferred embodiment of the invention, three bits (29:27) are used to respectively indicate whether the test is to include a greater than, equal, or less than comparison between the value of Operand2 (23:16) and the contents of the portion of the source register addressed by bits 12:8 and selected by bits 15:13, in the manner described hereinabove. The three OPCODE bits 29:27 are logically-ORed together, so that various tests are available as follows:

| Bits 29:27 | Test |
|---|---|
| 000 | no branch |
| 001 | < |
| 010 | = |
| 011 | ≤ |
| 100 | > |
| 101 | ≠ |
| 110 | ≥ |
| 111 | unconditional branch |

Bit position 24 in this instruction, as before, indicates whether bit positions 23:16 include an immediate operand for use in the comparison (bit 24 set) or whether bit positions 23:16 specify a portion of a register in register file 24 (bit 24 clear), decoded as described hereinabove.

The offset field (26:25, 7:0) in this instruction specifies the target instruction address, as an offset relative to the current value of program counter 26, to which control is to pass in the event that the test specified by bits 29:27 is true, for the values of the operands specified in fields 24:16 and 15:8. According to the preferred embodiment of the invention, this offset field (26:25, 7:0) is a 2's-complement value, permitting both forward and backward branches relative to the current program counter value. As illustrated in FIG. 3, this result is forwarded to program counter 36 by ALU 30, which occurs immediately upon evaluation of the specified test as performed by ALU 30.

Accordingly, program counter 36 is updated in the same machine cycle as the test is evaluated, thus resulting in a singlecycle test and branch instruction performable by packed data structure processor 25 according to this embodiment of the invention. No flags register is provided to receive the result of the test, which eliminates the necessity of a separate test instruction to interrogate the value of the flag, as is typically performed in conventional CISC processors. As is apparent from the foregoing description, this single cycle test and branch instruction is particularly well suited for packed data structures, due to the selection capabilities of the operands as described above. Furthermore, the single-cycle operation described hereinabove, provides high performance operation even though packed data structure processor 25 is not a pipelined microprocessor; as a result, branch prediction and other complex overhead operations and circuitry are not necessary.

Referring again to FIG. 3, the operation of coprocessor interface 41 in packed data structure processor 25 according to the preferred embodiment of the present invention will now be described. As noted above, coprocessor interface 41 is in bidirectional communication with ALU 30, is connected to drive coprocessor address bus COPA to register file 42, and is in bidirectional communication with register file 42 via coprocessor data bus COPD.

According to the preferred embodiment of the present invention, specific instructions are executed by packed data structure processor 25 to write data to a selected one of the registers in register file 42, and to read data therefrom. This operation facilitates the access of packed data structure processor 25 to external circuitry, such as scheduling circuitry 44, in a manner that saves a significant number of machine cycles for such access. Furthermore, according to the present invention, these instructions permit selection of specific byte locations, such that multi-field operands may be loaded and stored in register file 42, thus facilitating high performance processing for the external circuitry as well.

An example of the instruction format according to the preferred embodiment of the invention for a load operation, in which an operand is read from register file 42 and stored into register file 24 of data structure processor 25, is as follows:

| OPCODE (31:28) | Don't care (27:25) | (reserved) (24:16) | SRCAdr (15:8) | DSTsel (7:5) | DSTAdr (4:0) |
|---|---|---|---|---|---|

In this example, the OPCODE field indicates that the instruction is a coprocessor load operation, where packed data structure processor 25 is to receive data on bus COPD from a selected register in register file 42. Bit positions 15:8 in the instruction format specify the register in register file 42 from which the data is to be read, and as such corresponds to the address value to be presented by coprocessor interface 41 onto address bus COPA. Bit positions 7:0 select the particular portion of the selected one of registers REG0 through REG30 in register file 24 to which the operand received on data bus COPD is to be written; this selection is performed by way of addressing the one of thirty-one possible registers with bit positions 4:0, and by selecting the BYTE, WORD, or DWORD location with bit positions 7:5, coded as described hereinabove.

In operation, the load operation performed by packed data structure processor 25 according to the preferred embodiment of the invention is performed by coprocessor interface 41 generating the register file 42 address on bus COPA based upon bit positions 15:8 in the instruction code, in response to which register file 42 presents the contents of the selected register on bus COPD. This data on bus COPD is received by coprocessor interface 41, and applied to writeback bus WBBUS via ALU 30 and shifter 34, for storage in the selected portion of the selected register REG0 through REG30 indicated by the instruction code, under the control of destination selector 40. Because of the Harvard architecture of packed data structure processor 25, this instruction may be executed in a single machine cycle.

Packed data structure processor 25 conversely performs a store operation, by way of which an operand is stored in a selected register of register file 42. According to the preferred embodiment of the invention, packed data structure processor 25 is capable of automatically concatenating an operand (either in a location of register file 24 or an immediate operand) with the contents of a location of register file 24, as will now be described. According to this embodiment of the invention, an exemplary instruction format for the coprocessor store operation is as follows:

| OPCODE (31:28) | Don't care (27:25) | IO (24) | MSB-Operand (23:16) | SRCAdr (15:8) | DSTsel (7:5) | DSTAdr (4:0) |
|---|---|---|---|---|---|---|

In this example, the OPCODE field indicates that the instruction is a coprocessor store operation, where packed data structure processor 25 is to present data on bus COPD for storage into a register of register file 42 as specified by the address on address bus COPA. Bit positions 15:8 in the instruction format specify the register in register file 42 to which the data is to be written, and as such corresponds to the address value to be presented by coprocessor interface 41 onto address bus COPA. Bit positions 7:0 select the particular portion of the selected one of registers REG0 through REG31 in register file 24 containing an operand that is to be presented on data bus COPD; His selection is performed by way of addressing the one of thirty-two possible source registers with bit positions 4:0, and by selecting the BYTE, WORD, or DWORD location with bit positions 7:5, coded as described hereinabove.

The immediate operand field (bit 24) in the instruction format of this store instruction indicate indicates whether the contents of the MSBOperand field is an immediate operand (ie., specified in the instruction itself) or a register address. In this embodiment of the invention, if the IO field is set, bit positions 23:16 present the value of an immediate eight-bit operand that is concatenated with the contents of the source portion of register file 24. If the IO field is clear, bit positions 23:16 select a portion of one of registers REG0 through REG31 in register file 24 for use as an operand. The selection by bit positions 23:16 takes place in the manner discussed above, with bit positions 20:16 selecting the one of registers REG0 through REG31 in which this operand is stored, with bit positions 23:21 selecting the particular portion (BYTE, WORD, DWORD) that is to be used, with the coding of this three-bit code corresponding to the coding described hereinabove.

In this example, concatenation of the MSBOperand field with the contents of the source register occurs substantially automatically, with the value corresponding to that of the MSBOperand field (either as an immediate value or as a register contents) applied as an eight-bit value at the highest MSBs of bus COPD, and with the other twenty-four bits of bus COPD receiving the contents of the specified source register portion. In the case where a double-word operand is retrieved from the source register of register file 24, the concatenation process according to this embodiment of the present invention simply forwards only the least significant twenty-four bits, with the eight MSBs corresponding to the MSBOperand field. Of course, if the source operand is less than twenty-four bits, the idle bits may be simply zero-packed.

According to this embodiment of the invention, therefore, as noted above relative to the load operation, store operations to the external register file via coprocessor buses COPA, COPD are quite efficient, and may be carried out in a single instruction cycle. This single instruction cycle includes, after the instruction fetch from instruction memory 38, the operations of one of operand multiplexers 26 and its associated shift/mask 28 retrieving the desired source operand from the one of registers REG0 through REG31 in register file 24 specified in the instruction code. Also at this point in the instruction, ALU 30 also receives either an immediate operand from the instruction code (on bus IBUS via control and instruction decode circuitry 32) or a register portion via another operand multiplexer 26 and associated shift/mask unit 28. ALU 30 then concatenates these operands, and presents the concatenated data word onto buses COPD for storage into the selected register in register file 42.

As is evident from the foregoing, the single-cycle store operation is readily carried out by packed data structure processor 25 according to the preferred embodiment of the present invention. Furthermore, the ability of packed data structure processor 25 to automatically concatenate a data word (either from the instruction in the case of the immediate operand, or from another register of register file 24) with a source operand enables certain repetitive special operations to be rapidly performed. For example, if the source register operands correspond to a channel number of an ATM cell, this store operation can readily concatenate a constant value with the channel number, as may be useful in resetting the states of ATM channels for use by scheduling circuitry 44. These operations may be readily carried out in single machine cycles according to this embodiment of the invention, thus providing important performance advantages over conventional circuitry.

The incorporation of coprocessor interface 41 in packed data structure processor 25 also provides the benefit of facilitating the implementation of packed data structure processor 25 into an application specific integrated circuit (ASIC). The simple method of accessing a large number of registers in external circuitry, such as in the host ASIC, greatly facilitates this modular approach. Furthermore, considering that status information is written into register REG31 by circuitry external to packed data structure processor 25, the store operations performable by packed data structure processor 25 enable rapid and easy forwarding of this status information directly into the circuitry associated with the external register file 42.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A data processing circuit, comprising:

a register file comprised of a plurality of general purpose registers;

an instruction memory, for presenting an instruction code upon an instruction bus responsive to receiving a program counter value;

a plurality of operand multiplexers, each operand multiplexer having inputs coupled to the register file to receive the contents of a plurality of the general purpose registers, and having a control input for selecting one of the plurality of general purpose registers;

a plurality of shift/mask circuits, each associated to one of the plurality of operand multiplexers, for receiving the contents of the one of the plurality of general purpose registers selected by its associated operand multiplexer, and having control inputs for receiving control signals indicating the portion of the received contents to be forwarded thereby as specified by the instruction code;

an arithmetic logic unit, for executing data processing instructions upon the portions of the received contents of the plurality of general purpose registers forwarded thereto by the plurality of shift/mask circuits; and writeback circuitry, for receiving results from the arithmetic logic unit and for writing the results into one of the general purpose registers specified by the instruction code.

2. The data processing circuit of claim 1, wherein the writeback circuitry comprises:

shifter circuitry, coupled to the arithmetic logic unit, for shifting results from the arithmetic logic unit into bit locations specified by the instruction code and for presenting these shifted results upon a writeback bus; and a destination selector, coupled to receive the writeback bus at an input, for presenting the results on the writeback bus into one of the plurality of general purpose registers specified in the instruction code.

3. The data processing circuit of claim 1, further comprising:

a program counter, for storing an instruction address, and coupled to the arithmetic logic unit;

wherein the instruction memory has an input coupled to receive the contents of the program counter, and has an output connected to an instruction bus, for storing instruction codes and for presenting the same responsive to the instruction address;

and wherein the instruction bus is coupled to the destination selector and to the operand multiplexers, to control their operation according to the instruction code presented on the instruction bus.

4. The data processing circuit of claim 3, further comprising:

control and instruction decode circuitry, coupled to the instruction bus, for controlling the operation of the shift/mask circuits and the arithmetic logic unit responsive to the instruction codes.

5. The data processing circuit of claim 1, further comprising:

a memory interface, coupled to the arithmetic logic unit, for communicating the results of operations by the data processing circuit over a memory bus.

6. The data processing circuit of claim 5, further comprising:

a program counter, for storing an instruction address, and coupled to the arithmetic logic unit;

an instruction memory, having an input coupled to receive the contents of the program counter, and having an output connected to an instruction bus, for storing instruction codes and for presenting the same responsive to the instruction address;

wherein the instruction bus is coupled to the destination selector and to the operand multiplexers, to control their operation according to the instruction code presented on the instruction bus.

7. The data processing circuit of claim 5, further comprising:

coprocessor interface circuitry, coupled to the arithmetic logic unit and to a register file, for presenting a register address upon a coprocessor address bus, and for communicating data with external circuitry over a coprocessor data bus.

8. The data processing circuit of claim 1, wherein each of the plurality of general purpose registers includes a plurality of portions of various sizes;

and wherein the writeback circuitry is operable to write results from the arithmetic logic unit to a selected portion of a selected one of the plurality of general purpose registers indicated in the instruction code.

9. A method of operating data processing circuitry having a plurality of general purpose registers arranged in a register file, comprising:

accessing an instruction memory to place a selected instruction code onto an instruction bus;

selecting a portion of a first source register specified in the instruction code as a first operand;

determining a second operand;

performing an operation upon the first and second operands as specified in the instruction code, and applying a result of the operation upon a writeback bus; and storing the result in a portion of a destination register as specified in the instruction code.

10. The method of claim 9, wherein the accessing step comprises:

applying a program counter value to address an instruction memory, wherein the instruction memory stores a plurality of instruction codes in an addressable form.

11. The method of claim 10, wherein the step of performing an operation comprises:

performing a test upon the first and second operands, the test specified in the instruction code; and adjusting the program counter responsive to the result of the performing step returning a true value.

12. The method of claim 11, further comprising:

after the step of performing a test, incrementing the program counter responsive to the result of the performing step returning a false value.

13. The method of claim 9, wherein the step of determining a second operand comprises:

selecting a portion of a second source register as specified in the instruction code.

14. The method of claim 9, wherein the instruction code specifies performing a coprocessor interface action by a sequence of steps comprising:

receiving an instruction code indicating the storage of an operand into an external register file, the instruction code including a register address and a source address;

selecting a register location in the external register file responsive to the register address portion of the instruction code; and writing the operand into the selected register location in the external register file.

15. The method of claim 14, wherein the sequence of steps further comprises:

concatenating a second operand with the first operand prior to the writing step.

16. The method of claim 15, wherein the second operand is an immediate operand contained in the instruction code.

17. A data processing system, comprising:

at least one input/output device;

an instruction memory, for presenting an instruction code upon an instruction bus responsive to receiving a program counter value; and a packed data structure processor coupled to the at least one input/output device and to the instruction memory, comprising:

a register file comprised of a plurality of general purpose registers;

a plurality of operand multiplexers, each operand multiplexer having inputs coupled to the register file to receive the contents of a plurality of the general purpose registers, and having a control input for selecting one of the plurality of general purpose registers;

a plurality of shift/mask circuits, each associated to one of the plurality of operand multiplexers, for receiving the contents of the one of the plurality of general purpose registers selected by its associated operand multiplexer, and having control inputs for receiving control signals indicating the portion of the received contents to be forwarded thereby as specified by the instruction code;

an arithmetic logic unit, for executing data processing instructions upon the portions of the received contents of the plurality of general purpose registers forwarded thereto by the plurality of shift/mask circuits; and writeback circuitry, for receiving results from the arithmetic logic unit and for writing the results into one of the general purpose registers specified by the instruction code.

18. The system of claim 17, wherein the writeback circuitry comprises:

shifter circuitry, coupled to the arithmetic logic unit, for shifting results from the arithmetic logic unit into bit locations specified by the instruction code and for presenting these shifted results upon a writeback bus; and a destination selector, coupled to receive the writeback bus at an input, for presenting the results on the writeback bus into one of the plurality of general purpose registers specified in the instruction code.

19. The system of claim 17, further comprising:

a program counter, for storing an instruction address, and coupled to the arithmetic logic unit;

wherein the instruction memory has an input coupled to receive the contents of the program counter, and has an output connected to an instruction bus, for storing instruction codes and for presenting the same responsive to the instruction address;

and wherein the instruction bus is coupled to the destination selector and to the operand multiplexers, to control their operation according to the instruction code presented on the instruction bus.

20. The system of claim 17, further comprising:

a memory interface, coupled to the arithmetic logic unit, for communicating the results of operations by the data processing circuit over a memory bus.

21. The system of claim 17, further comprising:

a program counter, for storing an instruction address, and coupled to the arithmetic logic unit;

wherein the instruction bus is coupled to the destination selector and to the operand multiplexers, to control their operation according to the instruction code presented on the instruction bus.

22. The system of claim 17, further comprising:

a register file;

coprocessor interface circuitry, coupled to the arithmetic logic unit and to a register file, for presenting a register address upon a coprocessor address bus, and for communicating data with the register file over a coprocessor data bus.

* * * * *